United States Patent [19]   [11] Patent Number: 4,664,754
Caputi et al.   [45] Date of Patent: May 12, 1987

[54] SPENT LIQUID ORGANIC SOLVENT RECOVERY SYSTEM

[75] Inventors: Roger W. Caputi, Walnut Creek; Edward G. Pierick; Dennis V. Brumley, both of Fremont; Charles B. Kincaid, Pleasanton, all of Calif.

[73] Assignee: General Electric Company, San Jose, Calif.

[21] Appl. No.: 756,384

[22] Filed: Jul. 18, 1985

[51] Int. Cl.⁴ .............................................. B01D 3/02
[52] U.S. Cl. ..................................... 203/39; 202/204; 203/DIG. 11; 210/664; 210/774; 210/182
[58] Field of Search ................................ 202/168–170, 202/200, 664, 774, 175, 180, 181, 182, 187, 188, 176, 204; 210/664, 774, 675, 182, 187; 203/39, DIG. 11

[56] References Cited

U.S. PATENT DOCUMENTS 3,493,469  2/1970  Porter .................................. 202/176
3,666,633  5/1972  Essex et al. ......................... 202/204

FOREIGN PATENT DOCUMENTS 2001316  7/1971  Fed. Rep. of Germany.

Primary Examiner—Frank Sever
Attorney, Agent, or Firm—Ivor J. James, Jr.; Raymond G. Simkins

[57] ABSTRACT

An apparatus and method for continuously separating and recovering an organic liquid such as a hydrocarbon solvent from immiscible water and/or other impurities mixed therewith. The apparatus and method comprise a system for treating liquids while continuously flowing therethrough, including in series a gravity separation step followed by a distillation separation step.

15 Claims, 5 Drawing Figures

SPENT LIQUID ORGANIC SOLVENT RECOVERY SYSTEM

This invention comprises an apparatus and method providing a unique system for continuously rectifying and recovering spent or contaminated organic liquids for reuse, or for enhancing the degree of purity of organic liquids.

BACKGROUND OF THE INVENTION

Liquid organic compositions, typically comprising lower molecular weight hydrocarbons and haloginated hydrocarbons, are widely employed as solvents in a variety of diverse applications. Their use in this service includes, for example, dispersing media for reactants to facilitate their more rapid and complete activity in chemical processes, and as recovery or cleaning means in a number of manufacturing and reprocessing operations. Common and extensive applications of such solvents are extracting contaminating or extraneous agents and soil in a manufacturing process, and cleaning or restoring materials such as textiles and similar products by removing dirt and other impurities therefrom. This latter application would include the commonplace "dry cleaning" of wearing apparel.

The disposal of spent or waste organic materials comprising such solvents has become a subject of some concern and controversy because of possible environmental considerations, and because of apprehension as to the effects of exposure thereto upon the health of humans and animals.

Moreover, aside from the environmental and health factors, the costs of both properly disposing of spent or contaminated organic solvents and of replacement of disposed material is becoming increasingly higher.

SUMMARY OF THE INVENTION

This invention comprises a unique apparatus including a combination of a preceding decanting unit with a subsequent distillation unit, and a novel method which includes a given sequence of physical operations performed by the apparatus in concert. The invention provides a system for continuously isolating, purifying, and recovering organic liquid from a potentiallycontaminated mixture of the organic liquid with another immiscible liquid. The system of the invention utilizes differences in specific gravity and boiling temperatures to separate and purify liquids from mixtures.

The invention provides both a means of rejuvenating spent or waste solvent by restoring it to its original state of purity for recycling and reuse, and of refining a solvent of inferior purity to upgrade its level of purity.

OBJECTIVES OF THE INVENTION

It is a primary objective of this invention to provide an apparatus and method for continuously reclaiming spent organic solvents, or refining such solvents.

It is also an objective of this invention to provide an apparatus and method comprising a unique system wherein spent organic solvent is treated while flowing continuously through a series of reclaimrng stages which separate the organic solvent from any water and other entrained impurities including organic liquids of differing physical properties, thereby rejuvenating the solvent for reuse.

It is a further objective of this invention to provide an apparatus and method comprising a system for separating water and other impurities from organic liquid solvents which is effective with the liquid solvents and contaminants either continuously introduced into and passing through the system as an unending flowing stream, or intermittently introduced and terminated with alternating periods of continuous passage of a flowing stream of the liquid through the system and of quiescent conditions with the liquid substantially static throughout the system between the alternating periods of introductions of added liquid.

It is a still further objective of this invention to provide an apparatus and method comprising a system for treating and recovering spent or waste organic solvents from contamination with immiscible water and impurities mixed therewith wherein the system adjusts or compensates for the volume of the total amount of organic liquid and any water passing therethrough and also for the relative ratios of the organic liquid to water in the raw liquid supplied thereto.

It is an additional objective of this invention to provide an improved system comprising an apparatus and method for continously isolating and recovering an organic liquid from immiscible water and other impurities.

DETAILED DESCRIPTION OF THE INVENTION

The organic liquid reclaiming system of this invention is composed of a combination of a series of cooperating units, including the following devices described in detail, which function interdependently in sequence to perform the successive operations of the reclamation process.

Since this invention relies upon differences in specific gravities and boiling points of the liquids processed as means for their separation, it applies to any combinations of immiscible liquids which differ discernably in such properties. However, the preferred embodiment described hereinafter is specifically directed to a combination of an organic liquid and water where the organic liquid has a density greater than that of water. For the case wherein the density ratio is the reverse, the piping system of the invention can be re-configured to provide a separation of equal quality to that described.

Figure 1:
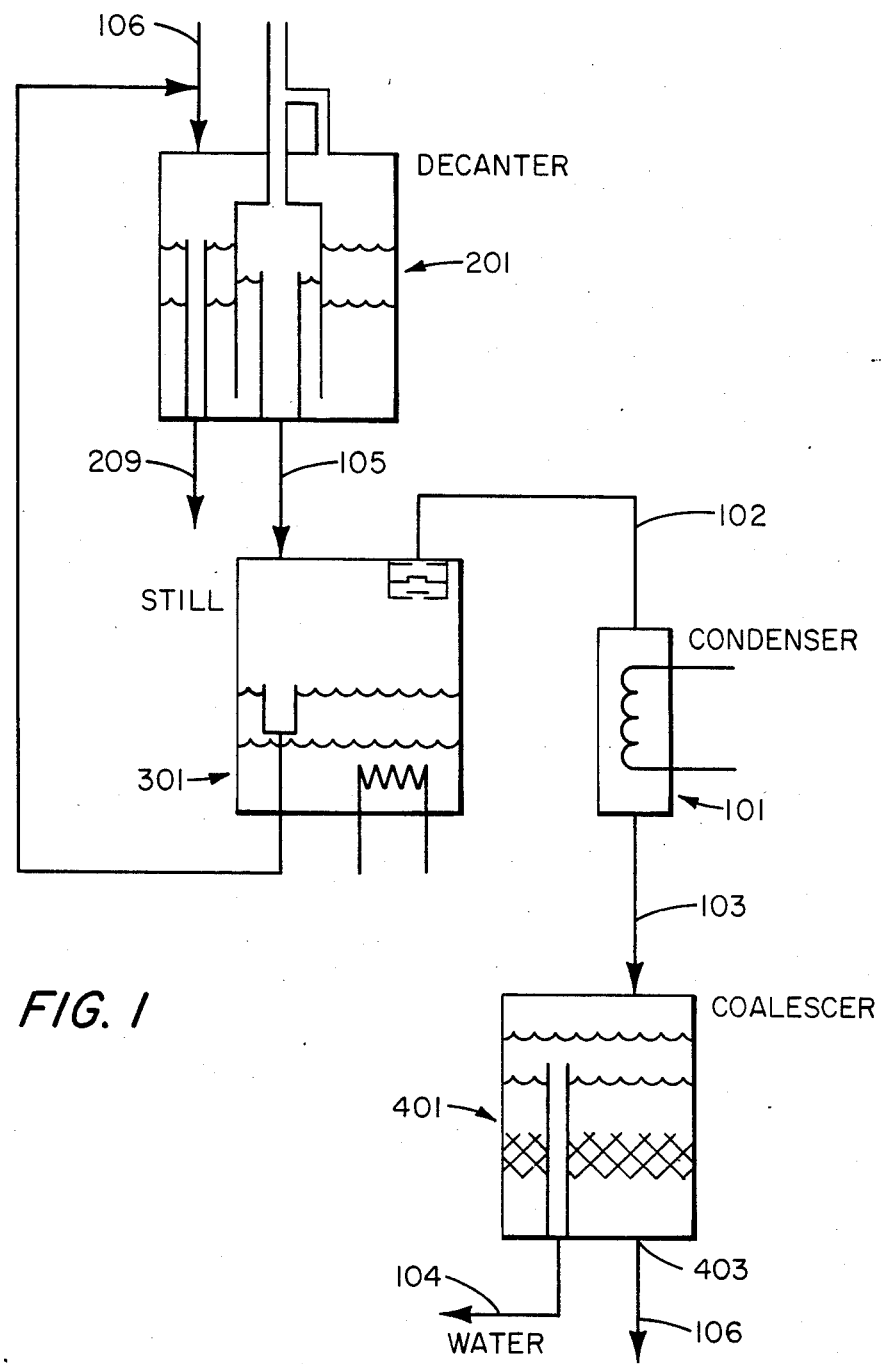
FIG. 1 of the drawing comprises a schematic diagram providing a flow sheet of the apparatus and method constituting the system and illustrating an embodiment of this invention.

Referring to the drawing, in particular FIG. 1 comprising an overall schematic of the recovering system, there is shown in operating sequence the combined series of a decanting unit 201, a distilling unit 301, a condenser unit 101 and a coalescing unit 401.

Preferably, for obvious reasons, the raw liquid mixture introduced into this system for treatment is prefiltered with a conventional filter unit of apt specification to remove any solids entrained therein before its treatment according to the invention.

An organic liquid comprising spent or waste solvent, or simply containing therein an unsuitable quantity of water or other immiscible impurities, is introduced into the system through inlet conduit 106 which feeds the raw liquid initially into decanter unit 201 following its filtration and separation therefrom of any insolubles.

Figure 2:
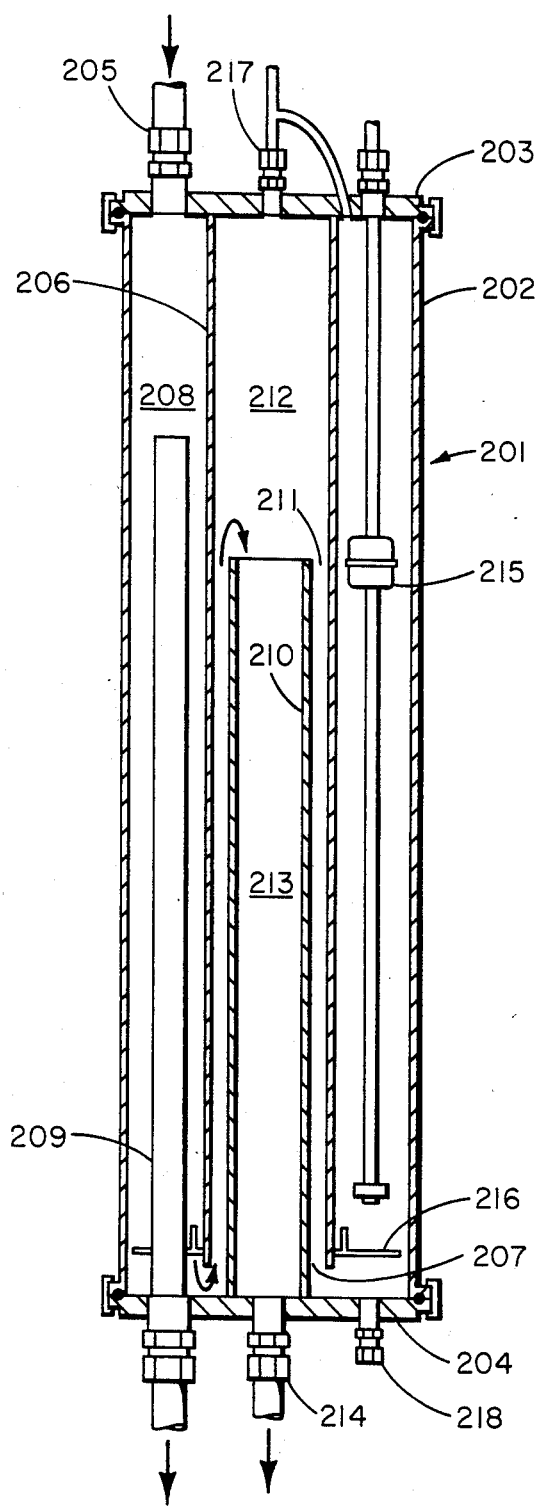
FIG. 2 comprises a sectional view of one component of the apparatus of this invention, a decanting unit.

The decanter unit 201, shown in detail in FIG. 2, comprises a generally vertically positioned, elongated cylindrical vessel having an outer cylindrical containment wall 202 closed at each extremity by upper circular end wall 203 and lower circular end wall 204. Inlet conduit 205 passes through upper end wall 203 to supply raw liquid into the upper area of the decanter unit 201.

The decanter unit 201 is provided with an inner cylindrical wall 206 of smaller diameter than outer vessel wall 202 and generally concentric therewith, whereby it is spaced inwardly from outer wall 202. Inner wall 206 extends down from the vessel upper wall 203 and terminates a short distance before making contact with the vessel lower wall 204, thus providing a small annular opening 207, or underpass, below the lower terminus of inner wall 206, between it and the vessel lower end wall 204.

Outer vessel wall 202 and concentric inner wall 206 define an annular chamber 208 therebetween, providing the gravity separating chamber for stratifying liquids of different specific gravities. Inlet conduit 205 passes through the upper end wall 203 into the upper area of annular chamber 208 for supplying raw liquid thereinto. Annular chamber 208 providing the gravity-separating chamber 208 is of greatly increased cross-section and volume with respect to inlet conduit 205 whereby flow velocity and turbulence of the liquid contents passing therethrough are reduced and quiescent residence time therein is increased to foster gravity stratification of liquids of different specific gravities. An outlet conduit 209 having a variable level intake passes through lower end wall 204 into annular chamber 208 for discharging separated immiscible waste liquid from a specific level in chamber 208 as dictated by hydraulic design considerations.

A cylindrical central wall 210 of smaller diameter than inner cylindrical wall 206 and generally concentric therewith, whereby it is spaced inwardly from inner wall 206, extends upward from vessel lower end wall 204. An annular intermediate channel 211 is thus provided between concentric inner wall 206 and central wall 210. Cylindrical central wall 210 terminates before making contact with the vessel upper wall 203, thus providing an open area 212 above its upper terminus. Cylindrical central wall 210 provides a reservoir chamber 213 therein. Outlet conduit 214 passes through lower end wall 204 and into the lower area of reservoir chamber 213 for discharging liquid from the lower portion thereof.

As constructed, decanting unit 201 is formed with an annular gravity separating chamber 208 providing a liquid stratifying area defined by cylindrical outer vessel wall 202 and concentric inner wall 206, a liquid flow path down through the gravity separating chamber to the underpass opening 207 beneath inner wall 206 then up through the annular intermediate channel 211 between concentric cylindrical inner wall 206 and central wall 210 to open area 212 and then down into the central reservoir chamber 213. Thus, the construction of the decanting unit provides a reversing direction, serpentine liquid flow path downward through the gravity separating chamber, then turning about upward through the intermediate channel and reversing again downward through the reservoir chamber.

Decanting unit 201, in a preferred embodiment of the invention, is provided with a level switch device 215 having a double-setpoint level switch assembly to sense the level and changes therein of a liquid phase interface between the gravity separating organic liquid and immiscible water or another organic within the annular gravity separating chamber 208. The level switch device 215 is arranged to signal for continuing introduction or cessation of liquid feed through inlet conduit 205 into decanter unit 201, and in turn through the system, by controlling a raw liquid supply by means such as a valve or pump (not shown).

A turbulence breaking screen 216 is included in annular gravity separating chamber 208 spanning across it transversly at a lower portion thereof. Also a clean out and drain plug 218 is provided in lower end wall 204 for apparent reasons.

Hydraulic design dictates that volumes 208 and 212 be vented by vent 217 to allow free flow of process liquids and stabilization of the liquid interface.

Figure 3:
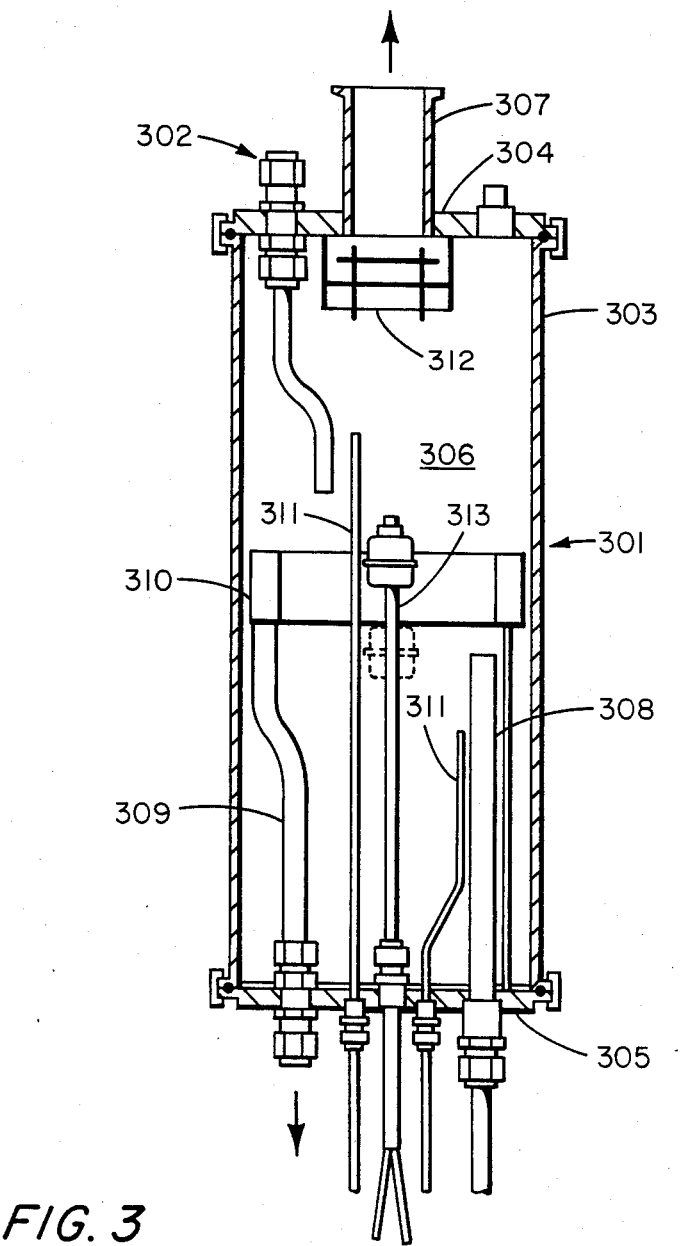
FIG. 3 comprises a sectional view of a second component of the apparatus of this invention, a distilling unit.

The distillation unit 301, shown in detail in FIG. 3, is connected with the decanting unit 201 through transfer conduit 105 for conveying the gravity separated, and in turn generally organic rich liquid with any remaining entrained water or another organic liquid, from the decanting unit 201 into the still for further separation or refinement and passage through the system.

Distillation unit 301 preferably comprises a generally vertically positioned, elongated cylindrical vessel, although it can be of any apt configuration for its designed function of a still for controlled liquid evaporation.

In a preferred embodiment, distillation unit 301 has an outer cylindrical containment wall 303 closed at each extremity by an upper circular end wall 304 and lower circular end wall 305 defining a distilling area 306. Transfer conduit 105 passes through inlet 302 in the upper end wall 304, or other apt location of the still, to transfer the gravity separated liquid from decanter unit 201 and feed it into the distillation unit 301. Distillation unit 301 is provided with a distilled vapor outlet 307 in an upper portion thereof, preferably in upper end wall 304, for expelling the vapor of a lower boiling liquid.

Distillation unit 301 is provided with a suitable heat source to supply the thermal energy to evaporate portions of the contents thereof. A preferred embodiment of the still, as illustrated in the drawing, comprises one or more electric heater elements 308 located in a lower portion of the vessel.

Distillation unit 301 is also provided with a discharge conduit 309 which extends upward through the lower wall 305 of the unit and continues up into the unit 301 to locate its open end for receiving liquid to be discharged therethrough at an intermediate location. In a preferred embodiment the discharge conduit 309 is vertically movable so that the height of its open receiving end can be changed in elevation with respect to the interior of the distillation unit 301.

When the purification treatment of this invention is applied to an organic liquid contaminated with liquids of lower densities than the liquid being purified, the embodiment of the distillation unit shown in FIG. 3 is preferred. In this version of the distillation unit 301 of the invention, a trough 310 is mounted on discharge conduit 309 so that liquid received into the trough flows down into the open end of the contacting discharge conduit 309 for removal from the unit. Trough 310 preferably is in the configuration of an annular open top receptacle encircling the distillation area 306 substantially adjacent to the cylindrical containment wall 303, and is located generally intermediate in the still vessel for the collection and discharge of higher boiling, immiscible, lower density liquid impurities. Being mounted on the vertically adjustable discharge conduit 309, the trough 310 is thus vertically movable and is positioned above the still heat source and approximately level with the liquid upper surface where the lighter density, immiscible impurities concentrate.

Figure 5:
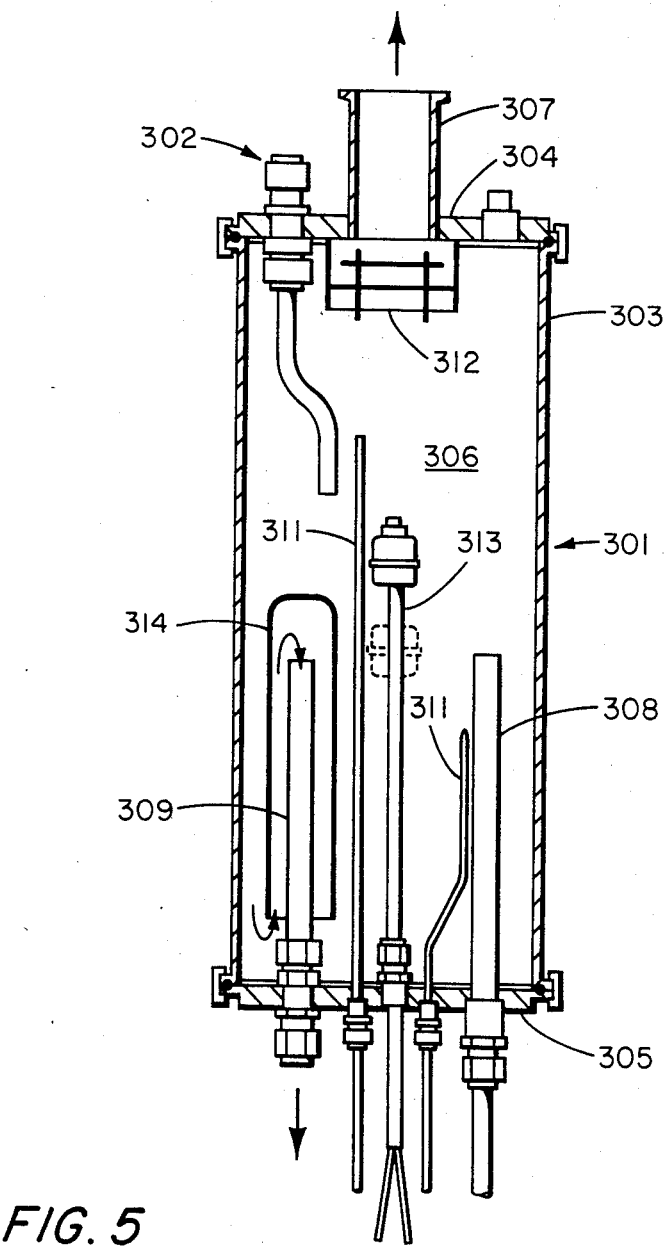
FIG. 5 comprises a sectional view of a modification of the second component of FIG. 3.

When the purification treatment of this invention is applied to an organic liquid contaminated with liquids of higher densities than the liquid being purified, the embodiment of the distillation unit shown in FIG. 5 is preferred. In this version of the distillation unit 301 of the invention a cylindrical baffle 314 with a closed upper end is mounted, in spaced apart relationship, down over discharge conduit 309. Cylindrical baffle 314 is positioned with its lower end spaced up and apart from the lower wall 305 of the distillation unit 301 whereby there is provided a reversing direction, serpentine liquid flow path from about the lower region of the unit 301 up between baffle 314 and discharge conduit 309 to the open end of conduit 309, then down and out from the distillation unit 301 through discharge conduit 309.

The open end of conduit 309, shrouded within the spaced apart baffle 314, is vertically adjustable along with conduit 309 as in the former embodiment and is typically positioned approximately level with the surface of the body of liquid being distilled. The lower edge of the cylindrical baffle 314, which terminates a short distance above the lower wall, provides a small annular opening or underpass below its lower terminus and between it and the lower wall 305 where the higher density immiscible impurities concentrate.

Distillation unit 301 thus provides for receiving an organic rich liquid which may contain some entrained immiscible liquid (water or other organics) from the decanting unit 201 and furthering the separation and purification thereof by means of distillation. The lower boiling phase is thus evaporated with the thermal energy from the heat source 308 and the vapor thereof expelled through vapor outlet 307. The higher boiling phase of the liquid in conjunction with the non-volatile contaminants is periodically discharged from distillation unit 301 through conduit 309.

The distillation unit 301 in a preferred embodiment is provided with one or more temperature sensing means such as thermocouples 311 for governing the operation of the still by controlling the heat input. Distillation unit 301 in its preferred embodiment include de-entrainment baffles 312 preceding the vapor outlet to remove liquid droplets from the exhausting vapor.

Distillation unit 301 is also provided in a preferred embodiment with level switch device 313 having a double-setpoint level switch assembly to sense the liquid surface and to control the filling and cessation of filling of the unit. The upper setpoint of a float assembly is set to allow a small excess of liquid feed into the unit and thus, by hydraulic pressure, liquid comprising immiscible impurities is forced to discharge through conduit 309.

As is typical, the vaporized liquid from distillation unit 301 is conveyed through conduit 102 to a condenser 101 to cool and condense the vapor back to liquid form. Condensed liquid is then passed on from condenser 101 through conduit 103 to coalescer 401 for a final separation of any remaining entrained immiscible liquid from the product organic liquid. Thus, the separated and purified organic liquid as the recovered product passes out through outlet 403 while any water or other immiscible liquid is expelled through discharge conduit 104 to waste.

Figure 4:
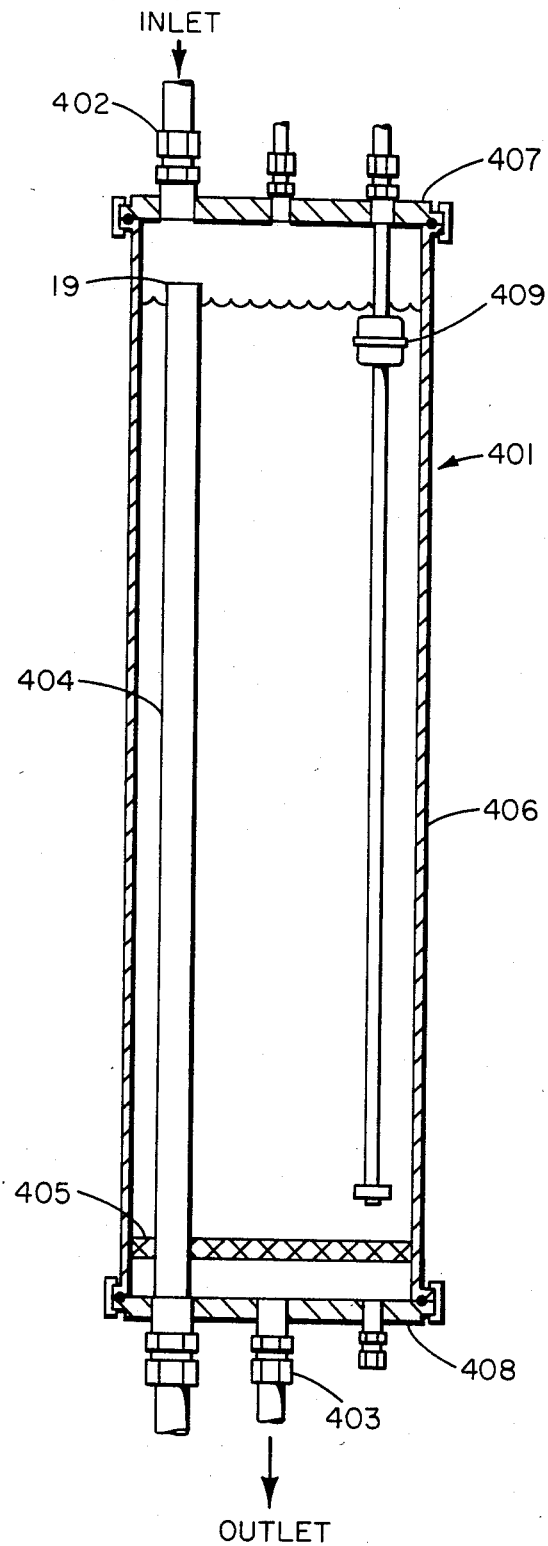
FIG. 4 comprises a sectional view of another component of the apparatus of this invention, a coalescing unit.

The coalescer 401, as is conventional, can comprise a very fine screen, e.g., 325 mesh or smaller, or a bed of fine intermeshed fiber as the coalescing medium commonly used in commercially available devices. Examples of coalescing devices are U.S. Pat. Nos. 3,853,513 and 3,692,467. However, a preferred embodiment of the coalescer 401, shown in detail in FIG. 4, incorporates a bed of three dimensional, microporous, sintered, hydrophobic, polymer bead, frit 405, in place of a fine screen or fiber, as a coalescence surface to increase the contact of micro-droplets of water and enhance the formation of a bulk water phase. The coalescing medium is of course positioned within the vessel between the inlet and outlet whereby the liquid must permeate through its mass.

Coalescer unit 401 comprises a side containment wall 406, upper and lower end walls 407 and 408 respectively, with inlet 402 connected to conduit 103 for receiving liquid from the condenser 101. An outlet conduit 404 having a variable level intake passes up through the lower end wall 408 into the coalescer unit 401 for discharging any accumulated water. An outlet 403 is positioned in the vessel on the opposite side of the coalescing material for the discharge of water free organic liquid.

Coalescer 401 is provided with a level switch device 409 having a double-setpoint level switch assembly for sensing an interface between liquids as in decanter unit 201 and controlling a drain device such as a pump or valve (not shown).

An example of the method of this invention and operation of the several components of the system is as follows.

To initiate operation of the system, the unit should first be charged with a quantity of pure liquid such that annular chamber 208 is filled to about half its height. This pre-charge insures that the "waste" liquid, because of the unit's hydraulic design, can never flow into the annular intermediate channel 211 or the central reservoir 213 where the separated recovery liquid is stored.

An organic liquid comprising spent or waste solvent, or simply containing therein an unsuitable quantity of water or other immiscible impurities, is introduced into the decanter unit 201 through inlet fitting 205 which feeds the raw liquid initially into the decanter unit following its filtration and separation therefrom of any insolubles.

During normal operation, the raw liquid mixture, typically an organic solvent (for purposes of this example, the solvent is assumed to be a fluorinated hydrocarbon, Freon TF) with an immiscible water phase, is introduced into the decanter through inlet 205, FIG. 2. In this example, the density of the organic phase is greater than that of water. The organic phase can contain up to two weight percent dissolved water and can be present in mixtures that vary from 99 percent organic with only trace amount of water to 99 percent bulk water with trace amounts of water-saturated organic. The decanter unit is designed for routine operation over the whole range of liquid mixture compositions.

The decanter separates the two bulk phases in annular chamber 208. As the raw liquid continues to inflow, the separated organic phase rises through annular area 211, overflowing and filling reservoir 213 until float 215, having a density greater than the aqueous phase and less than the organic phase whereby it floats at the interface of the two phases, rises until it reaches a setpoint intermediate to the top of central wall 210 and of outlet conduit 209. At this point, the inflow is terminated by shutoff of the inlet device such as valve or pump.

During raw liquid inflow, the level of separated bulk water can rise to the top of outlet 209 and overflow to waste. This will continue until float 215 reaches its setpoint.

As reservoir 213 is drained to the still by demand from still float 313, decanter float 215 drops to a second, lower setpoint and inflow is reinitiated to the decanter, whereupon phase separation, water outflow, and filling of the central reservoir reoccur.

Inflow to the still of raw organic containing some residual dissolved water is controlled by still float 313, FIG. 3. The float senses the level of liquid in the still and, through use of a valve, pump, or other feed device, initiates inflow when the float reaches a lower setpoint and terminates inflow when it reaches an upper setpoint, and when a pre-set time delay initiated at the upper setpoint has been completed. This time delay allows overflow and discharge through conduit 309 of immiscible liquid, e.g., water, carried over in dissolved form from the decanter and concentrated in the liquid in the still to a level exeeding its solubility.

In this illustration, thermal energy supplied by heat source 308 causes evaporation of the organic liquid, of up to about 5000 ppm of water, and of up to 1-2 ppm of non-volatile impurities. All but trace quantities of non-volatile impurities are left behind and concentrated in the still. These concentrated by-products are removed from the still by periodic draining.

The volatilized organic and any entrained water vapors are routed to and condensed in a condenser 101, the preferred embodiment of which is water-cooled. Mixed vapors condense as two separate phases. At this stage, the purified organic contains approximately 100 ppm dissolved water and about 4900 ppm of dispersed micro-droplets of water as a second phase.

The two-phase condensate drains by gravity to coalescer 401 through inlet 402 located above a bed of three-dimensional, microporous, sintered, hydrophobic, polymer bead frit. This frit, by its hydrophobic nature, allows free flow of the organic through the frit and fosters the coalescence of dispersed micro-droplets of water to macro-droplets that leave the top surface of the frit and float to the top of the bulk organic phase. These macro-droplets form a bulk water phase which overflows to waste through outlet conduit 404.

When the height of the water-organic interface within the coalescing unit reaches the upper setpoint, float 409 initiates draining of separated, purified organic containing 100 ppm water through a drier to a final product tank by valve, pump, or other appropriate transfer device. When float 409 reaches the lower setpoint, draining is terminated. This lower setpoint is set such that the frit is always covered with an organic layer.

When the decanter unit 201 is designed for a specific application, the inner reservoir chamber 213 is sized to contain a working inventory for subsequent processing. If no further processing of the decanter product is planned, the reservoir may be of any convenient size, though the top of central wall 210 must be lower than the top of outlet conduit 209, as will be explained.

The height of outlet conduit 209 and central wall 210 are related by the following relationship: the product of the conduit height and the light phase specific gravity (weight of light phase liquid in annular chamber 208 if only light phase liquid is present) should be less than the product of the central wall height and the heavy phase specific gravity (weight of heavy phase liquid in intermediate channel 211). When this is true and the unit has an initial change of the heavy phase liquid, further raw feed additions, even if pure light phase liquid, will never cause the light phase to overflow into central reservoir 213.

The actual height chosen of outlet conduit 209 when related to the height of central wall 210 determines the height of the interface between the light and heavy phases above lower end wall 204 in annular chamber 208. The interface height is determined as follows: the product of the height of central wall 210 and the heavy phase specific gravity (weight of heavy phase liquid in intermediate channel 211) equals the sum of the products of the interface height and the heavy phase specific gravity added to the product the light phase specific gravity and the distance from the top overflow conduit 209 to the interface (the weights of heavy and light phase liquids in annular chamber 208). The heights of overflow conduit 209 and central wall 210, then, are chosen based on the user's desired depth of heavy phase annular chamber 208 and such that the light will not overflow into central reservoir 213, the overall diameter of the decanter unit is chosen for overall capacity.

What is claimed is:

1. A liquid waste treating apparatus comprising: means utilizing differences in specific gravity and boiling temperature for continuously isolating and recovering spent organic liquid from immiscible liquid impurities of different specific gravity or boiling temperature mixed therethrough, including the combination and sequence of means for separating the organic liquid from such mixtures containing variable ratios of the organic liquid and immiscible liquid impurities, further including, (a) a decanting unit having means for separating immiscible liquids of different specific gravities while flowing therethrough comprising a generally vertically positioned, elongated cylindrical vessel having an outer annular gravity-separating chamber defined by a pair of generally concentric cylindrical walls comprising an outer wall forming the vessel containment and an inner wall extending from the vessel top downward towards but not in contact with the vessel bottom to provide an underpass for the flow of liquid thereunder and out of the annular separating chamber, and a central reservoir chamber defined by a cylindrical wall spaced inwardly away from the inner wall of the annular separating chamber and extending from the vessel bottom upward towards but not in contact with the vessel top to provide an annular intermediate channel between the outer separation chamber and central reservoir chamber and an overpass for the flow of liquid thereover into the reservoir chamber, means providing a reversing serpentine flow path of downward through the separating chamber and under the inner wall thereof then upward through the annular intermediate channel and over the cylindrical wall of and into the central reservoir chamber, said separating chamber having an inlet for supplying an immiscible liquid waste mixture of different specific gravities thereto for recovery treatment and an outlet conduit having a variable level intake for discharging gravity separated waste liquid from an intermediate level in said chamber, and asid reservoir chamber having an outlet positioned in a lower portion thereof for discharging gravity separated liquid into a downstream distillation unit; and (b) a distillation unit having means for separating immiscible liquid of a different boiling temperature while flowing therethrough comprising a vessel having an inlet connected with the outlet of said reservoir chamber of the decanting unit and extending into the distillation vessel for the transfer of gravity separated liquid from the reseroir to the distrillation vessel, said distillation vessel being provided with a heating element as a source of heat for vaporizing any lower boiling liquid contents therein and having an outlet vent in an upper portion thereof for discharge of vaporized liquid therefrom into a downstream condenser, and an annular trough of vertically adjustable height connected to an outlet conduit for discharging higher boiling immiscible liquid from the distillation vessel.

2. The liquid waste treating apparatus of claim 1 including a downstream condenser connected through a conduit to the outlet vent of the distillation unit for the discharge of higher boiling vaporized liquid from the distillation unit to condense vaporized liquid therefrom and a further downstream coalescer for removing any water entrained in the condensed liquid from the distillation unit.

3. A liquid waste treating apparatus comprising: means utilizing differences in specific gravity and boiling temperature for continuously isolating and recovering spent organic liquid from immiscible liquid impurities of different sepcific sgravity or boiling temperature mixed therethrough, including the combination and sequence o means for separating the organic liquid from such mixtures containing variable ratios of the organic liquid and immiscible liquid impurities, further including;

(a) a decanting unit having means for separating immiscible liquids of different specific gravities while flowing therethrough comprising a generally vertically positioned, elongated cylindrical vesse having an outer annular gravity-separating chamber defined by a pair of generally concentric cylindrical walls comprising an outer wall forming the vessel containment and an inner wall extending from the vessel top downward towards but not in contact with the vessel bottom to provide an underpass for the flow of liquid thereunder and out of the annular separating chamber, and a central resrvoir chamber defined by a cylindrical wall spaced inwardly away from the inner wall of the annular separating chamber and extending from the vessel bottom upward towards but not in contact with the vessel top to provide an annular intermediate channel between the outer separation chamber and central reservoir chamber and an overpass for the flow of liquid thereover into the reservoir chamber, means providing a reversing serpentine flow path of downward through the separating chamber and under the inner wall thereof, then upward through the annular intermediate channel and over the cylindrical wall of and into the central reservoir chamber, said separating chamber having an inlet for supplying an immiscible liquid waste mixture of different specific gravities thereto for recovery treatment and an outlet conduit having a variable level intake for discharging gravity separated waste liquid from an intermediate level in said chamber, and said reservoir chamber having an outlet position in a lower portion thereof for discharging gravity separated liquid into a downstream distrillation unit; and (b) a distillation unit having means for separating immiscible liquid of a different boiling temperature while flowing therethrough comprising a vessel having an inlet connected with the outlet of said reservoir chamber of the decanting unit and extending into the distillation vessel for the transfer of gravity separated liquid from the reservoir to the distrillation vessel, said distillation vessel being provided with a heating element as a source of heat for vaporizing any lower boiling liquid contents therein and having an outlet vent in an upper portion thereof for discharge of vaporized liquid therefrom into a downstream condenser, and a cylindrical baffle shrouding an outlet conduit fopr discharging higher boiling immiscible liquid from the distillation vessel.

4. The liquid waste treating apparatus of claim 3 including a downstream condenser connected through a conduit to the outlet vent of the distillation unit for the discharge of higher boiling vaporized liquid from the distillation unit to condense vaporized liquid therefrom and a coalescer for removing any water entrained in the condensed liquid from the distillation unit.

5. A liquid waste treating process comprising:
(a) providing means utilizing differences in specific gravity and boiling temperature for continuously isolating and recovering spent organic liquid from immiscible water impurity of different specific gravity or boiling temperature mixed therethrough, including the combination and sequence of steps of separating the organic liquid from such mixtures containing varaible ratios of the organic liquid and immiscible water impurity, (b) passing an immiscible liquid waste mixture containing water and an organic liquid heavier than water initially into and through a decanting unit and therein gravity separating water as the lighter liquid from the heavier organic liquid by passing the liquid mixture into a gravity stratifying area of increased volume whereby flow velocity and turbulence are reduced and quiescent residence time increased to foster gravity stratification of the immiscible liquids of different weight;

(c) withdrawing water from an upper area of the decanting unit comprising the lighter liquid water for discharge from the unit while passing heavier gravity separated organic liquid through a reversing serpentine flow path into a reservoir chamber, and withdrawing the heavier organic liquid from the reservoir;

(d) passing said withdrawn heavier gravity separated organic liquid from the decanting unit into a distilling unit and therein separating the organic liquid having a lower boiling temperature than water from any water still retained in the organic liquid by heating the gravity-separated liquid to vaporize the lower boiling organic liquid and expel vaporized organic liquid from the distrilling unit into a condensing unit, and withdrawing any higher boiling residual water from the distilling unit for disposal; and (e) passing said vaporized organic liquid from the distilling unit through a condensing unit and therein liquidifying the lower boiling organic and discharging the thus isolated condensed organic liquid into a coalescing unit for further separation of any immiscible retained in said organic liquid.

6. The process of claim 5 wherein the immiscible liquid mixture comprises water and an organic liquid having a specific gravity of at least about 1.3.

7. The process of claim 5 wherein the immiscible liquid mixture comprises a water and an organic liquid having a specific gravity in the range of about 1.3 to about 1.6.

8. The process of claim 5 wherein the immiscible liquid mixture comprises water and an organic liquid having a specific gravity higher than water and a boiling point lower than water.

9. A liquid waste treating process comprising: (a) providing means utilizing difference in specific gravity and boiling temperature for continuously isolating and recovering spent organic liquid from immiscible water impurity of different specific gravity or boiling temperature mixed therethrough, including the combination and sequence of steps for separating the organic liquid from such mixtures containing variable ratios of the organic liquid and immiscible water impurity, (b) passing an immiscible liquid waste mixture containing water and an organic liquid heavier than water and having a lower boiling point than water initially into and through a decanting unit and therein gravity separating water as the light liquid from the heavier organic liquid by passing the liquid mixture into a gravity stratifying area of increased cross-section and volume whereby flow velocity and turbulence are reduced and quiescent residence time increased to foster gravity stratification of the mixed immiscible liquids of different weight;

(c) withdrawing from an upper area of the decanting unit comprising the light water for discharge from the unit while passing separated heavier gravity separated organic liquid through a reversing serpentine flow path into a reservoir chamber, and withdrawing the heavier organic liquid from the reservoir chamber;

(d) passing said withdrawn heavier graivty separated organic liquid from the decanting unit into a distilling unit and therein separating the lower boiling organic liquid from the water still retained in the organic liquid by heating the gravity-separated liquid to vaporize the lower boioing organic liquid and expel the vaporized organic liquid from the distilling unit into a condensing unit, and withdrawing any higher residual water from the distilling unit for disposal; and (e) passing said vaporized organic liquid from the distilling unit through a condesning unit and therein liquidifying the lower boiling organic vapor and discharging the thus isolated condensed organic liquid into a coalescing unit and then passing same therethrough to separate out any residual water as yet retained in the organic liquid.

10. The process of claim 9, wherein the immiscible liquid mixture comprises water and an organic liquid having a specific gravity of at least about 1.3.

11. The process of claim 9, wherein the immiscible liquid mixture comprises water and an organic liquid having a specific gravity in the range of about 1.3 to about 1.6.

12. A liquid waste treating process comprising: (a) providing means utilizing differences in specific gravity and boiling temperature for continuously isolating and recovering spent organic liquid from immiscible water impurity of different specific gravity or boiling temperature mixed therethrough, including the combination and sequence of steps for separating the organic liquid from such mixtures containing variable ratios of the organic liquid and immiscible water impurity, (b) passing an immiscible liquid mixture containing water and an organic liquid denser than water and having a lower boiling point than water initially into and through a gravity decanting unit and therein gravity separating immiscible water as the light liquid from the denser organic liquid by conveying the liquid mixture into a gravity stratifying chamber of increased cross-section and volume whereby flow velocity and turbulence of the mixture are reduced and quiescent residence time increased to foster gravity stratification of the mixed immiscible liquids of different densities;

(c) withdrawing a stratified lighter phase comprising water from an upper zone of the decanting unit for discharge from the unit while flowing the gravity stratified heavier phase comprising denser organic liquid downward then upwardthrough a reversing course into a reservoir (d) withdrawing the heavier gravity separated phase comprising denser organic liquid from the reservoir chamber of the decanting unit and passing it into a distilling unit and therein separating the lower boiling organic liquid of the heavier phase from any retained water by heating to vaporize the lower boiling organic liquid and expel the vaporized liquid from the distilling unit into a condensing unit, and withdrawing a higher boiling phase comprising any residual water from an intermediate zone of the distrilling unit for disposal; and (e) passing said vaporized lower boiling organic liquid vented from the distilling unit into and through a condensing unit to liquidify the organic vapor and then passing said condensed organic liquid through a coalescing unit to separate therefrom any residual water as yet retained inthe vaporized and condensed organic liquid.

13. The process of claim 12, wherein the higher boiling phase comprising water withdrawn from the distillation unit is cycled-back into the decanting unit.

14. The process of claim 12, wherein the immiscible liquid mixture comprises water and a denser organic liquid having a specified gravity of at least about 1.3.

15. The process of claim 12, wherein the immiscible liquid mixture comprises water and a denser organic liquid having a specified gravity of about 1.3 to about 1.6.

* * * * *